United States Patent [19]

Tucker et al.

[11] Patent Number: 5,953,457

[45] Date of Patent: Sep. 14, 1999

[54] METHOD AND APPARATUS FOR IMPROVED VIDEO DECOMPRESSION BY PRESCALING OF PIXEL AND ERROR TERMS TO MERGING

[75] Inventors: Michael R. Tucker; Geoffrey S. Strongin; Yi Liu, all of Austin, Tex.

[73] Assignee: Advanced Micro Devices, Inc., Sunnyvale, Calif.

[21] Appl. No.: 08/887,678

[22] Filed: Jul. 3, 1997

Related U.S. Application Data

[63] Continuation of application No. 08/423,918, Apr. 18, 1995, abandoned.

[51] Int. Cl.$^6$ .............................. G06K 9/36; G06K 9/46; H04N 7/12
[52] U.S. Cl. ........................ 382/233; 382/236; 348/402; 348/405
[58] Field of Search .................................. 382/233, 236; 348/402, 405

[56] References Cited

U.S. PATENT DOCUMENTS

| | | | |
|---|---|---|---|
| 5,164,828 | 11/1992 | Tahara et al. | 358/136 |
| 5,329,318 | 7/1994 | Keith | 348/402 |
| 5,357,282 | 10/1994 | Lee | 348/403 |
| 5,369,438 | 11/1994 | Kim | 348/402 |
| 5,371,547 | 12/1994 | Siracusa et al. | 348/426 |
| 5,386,232 | 1/1995 | Golin et al. | 348/391 |
| 5,450,599 | 9/1995 | Horvath et al. | 395/800 |
| 5,502,493 | 3/1996 | Meyer | 348/426 |
| 5,515,388 | 5/1996 | Yagasaki | 348/405 |
| 5,523,847 | 6/1996 | Feig et al. | 358/261.3 |
| 5,543,846 | 8/1996 | Yagasaki | 348/415 |

OTHER PUBLICATIONS

Dr. Richard Baker, "Standards Dominate Videoconferencing Implementations", Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, pp. 1–11.

Peng H. Ang, et al., "Video Compression Makes Big Gains", IEEE Spectrum, Oct. 1991, pp. 16–19.

Andy C. Hung, et al, "A Comparison of Fast Inverse Discrete Cosine Transform Algorithms", Multimedia Systems, ©1994, pp. 204–217.

P1180/D1, "Draft Standard Specification for the Implementations of 8×8 Inverse Discrete Cosine Transform", May 29, 1990, pp. 1–9.

ISO/IEC 11172–1, Information Technology–Coding of Moving Pictures and Associated Audio for Digital Storage Media at up to about 1,5 Mbit/s—Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s—Part 1: Video, Aug. 1, 1993, pp. i–ix, 1–112.

ISO/IEC 11172–3, Information Technology–Coding of Moving Pictures and Associated Audio for Digital Storage Media at up to about 1,5 Mbit/s—Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

*Primary Examiner*—Andrew W. Johns
*Assistant Examiner*—Monica S. Davis
*Attorney, Agent, or Firm*—Skjerven, Morrill, MacPherson, Franklin & Friel LLP; Ken J. Koestner

[57] ABSTRACT

A video decoding apparatus and method greatly reduces the computational burden of video decoding by processing several pixels in parallel, thereby reducing the computational load by a factor approximating the number of pixels processed at one time.

18 Claims, 5 Drawing Sheets

+

=

→ clip[index]

.
.
.

Repeat for next three pixels

.
.
.

METHOD AND APPARATUS FOR IMPROVED VIDEO DECOMPRESSION BY PRESCALING OF PIXEL AND ERROR TERMS TO MERGING

This application is a continuation of application Ser. No. 08/423,918, filed Apr. 18, 1995, abandoned.

RELATED PATENT APPLICATIONS

The present invention is related to subject matter which is disclosed in:

U.S. patent application Ser. No. 08/423,913 filed on the same day as the present patent application (Geoffrey S. Strongin, Yi Liu and Michael R. Tucker, "Method and Apparatus for Improved Video Decompression by Selection of IDCT Method Based on Image Characteristics", U.S. patent application Ser. No. 08/423,912 filed on the same day as the present patent application (Yi Liu, Michael R. Tucker and Geoffrey S. Strongin, "Method and Apparatus for Improved Video Decompression by Selective Reduction of Spatial Resolution", now U.S. Pat. No. 5,864,637, U.S. patent application Ser. No. 08/424,738 filed on the same day as the present patent application (Yi Liu, Michael R. Tucker and Geoffrey S. Strongin, "Method and Apparatus for Hybrid VLC Bitstream Decoding", now abandoned, U.S. patent application Ser. No. 08/424,736 filed on the same day as the present patent application (Geoffrey S. Strongin, Yi Liu and Michael R. Tucker, "Method and Apparatus for Prestoring Dequantization Information for DCT VLC Decoding", now U.S. Pat. No. 5,784,494, U.S. patent application Ser. No. 08/443,206 filed on the same day as the present patent application (Yi Liu, Michael R. Tucker, and Geoffrey S. Strongin, "Method and Apparatus for Improved Video Decompression by Adaptive Selection of Video Input Parameters", now U.S. Pat. No. 5,680,482, and U.S. patent application Ser. No. 08/423,914 filed on the same day as the present patent application (Geoffrey S. Strongin, Yi Liu, and Michael R. Tucker, "Method and Apparatus for Improved Video Decompression by Predetermination of IDCT Results Based on Image Characteristics", now U.S. Pat. No. 5,872,886.

Each of the identified patent applications is incorporated herein by reference in its entirety.

FIELD OF THE INVENTION

The present invention relates to decompression of video information and, more particularly, to improved performance of video decompression by prescaling of pixel and error terms prior to merging.

BACKGROUND OF THE INVENTION

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a picture. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the moving pictures expert group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Pictures within the MPEG standard are divided into 16×16 pixel macroblocks. Each macroblock includes six 8×8 blocks: four luminance (Y) blocks, one chrominance red (Cr) block and one chrominance blue (Cb) block. The luminance blocks correspond to sets of 8×8 pixels on a display and control the brightness of respective pixels. The chrominance blocks to a large extent control the colors for sets of four pixels. For each set of four pixels on the display, there is a single Cr characteristic and a single Cb characteristic.

For example, referring to FIG. 1, labeled prior art, a picture presented by a typical display includes 240 lines of video information in which each line has 352 pixels. Accordingly, a picture includes 240×352=84,480 pixel locations. Under the MPEG standard, this picture of video includes 44 by 30 luminance blocks or 1320 blocks of luminance video information. Additionally, because each macroblock of information also includes two corresponding chrominance blocks, each picture of video information also includes 330 Cr blocks and 330 Cb blocks. Accordingly, each picture of video information requires 126,720 pixels or a total of 1,013,760 bits of bit mapped storage space for presentation on a display.

There are three types of pictures of video information which are defined by the MPEG standard, intra-pictures (I picture), forward predicted pictures (P picture) and bi-predicted pictures (B picture).

An I picture is encoded as a single image having no reference to any past or future picture. Each block of an I picture is encoded independently. Accordingly, when decoding an I picture, no motion processing is necessary. However, for the reasons discussed below, it is necessary to store and access I pictures for use in decoding other types of pictures.

A P picture is encoded relative to a past reference picture. A reference picture is a P or I picture. The past reference picture is the closest preceding reference picture. Each macroblock in a P picture can be encoded either as an I macroblock or as a P macroblock. A P macroblock is stored as a translated 16×16 area of a past reference picture plus an error term. To specify the location of the P macroblock, a motion vector (i.e., an indication of the relative position of the macroblock in the current picture to the position of the translated area in the past reference picture) is also encoded. When decoding a P macroblock, the 16×16 area from the reference picture is offset according to a motion vector. The decoding function accordingly includes motion compensation, which is performed on a macroblock, in combination with error (IDCT) terms, which are defined on a block by block basis.

A B picture is encoded relative to the past reference picture and a future reference picture. The future reference picture is the closest proceeding reference picture. Accordingly, the decoding of a B picture is similar to that of an P picture with the exception that a B picture motion vector may refer to areas in the future of the reference picture. For macroblocks that use both past and future reference pictures, the two 16×16 areas are averaged. The macroblocks from the reference pictures are offset according to motion vectors.

Pictures are coded using a discrete cosine transform (DCT) coding scheme which transforms pixels (or error terms) into a set of coefficients corresponding to amplitudes of specific cosine basis functions. The discrete cosine transform is applied in image compression to decorrelate picture data prior to quantization. The DCT coefficients are further coded using variable length coding. Variable length coding (VLC) is a statistical coding technique that assigns codewords to values to be encoded. Values of high frequency of occurrence are assigned short codewords, and those of infrequent occurrence are assigned long codewords. On the average, the more frequent shorter codewords dominate so that the code string is shorter than the original data.

For a video system to provide a motion video capability, compressed video information must be quickly and efficiently decoded. One aspect of the decoding process is inverse discrete cosine transformation (IDCT). A second aspect is a motion compensation operation. Both the IDCT operation and the motion compensation operation are computationally intensive operations. Over a wide range of processor capabilities and image characteristics, a condition sometimes arises in which the picture decoding operation overburdens a video system. Under this condition, video frames are commonly dropped or a lag in motion video results. A technique for providing such highly efficient inverse discrete transformation and decoding is necessary.

Pictures are coded and restored using the MPEG standard employing a prediction operation in which values of pixels within a picture are predicted from a previously occurring picture or, in some circumstances, a later occurring picture. Prediction typically utilizes a motion compensation operation in which values of pixels within a picture are predicted to be the same as the previous picture except that the position of the pixels is shifted by a motion vector. Differences between an actual picture and its corresponding predicted picture are then determined and encoded by transforming the difference data using a discrete cosine transform (DCT) operation, quantizing the difference terms and by variable-length coding the DCT coefficients. In this manner, a predicted picture is stored or communicated in the form of a video bitstream of the motion vectors and DCT coefficient blocks. When a video stream of coded values is restored, a predicted picture is obtained by shifting the pixels in the picture previous to the predicted picture in accordance with the motion vector, inverse quantizing and inverse discrete cosine transforming the stored difference term DCT coefficients and adding the restored error terms to the restored motion compensated pixels. Because of the quantization of data, the resulting restored pixel values are typically not the same as the original pixel values. Generally, the differences in restored pixel values are not noticeable. However, at the high and low boundaries of the pixel value range, the differences can result in overflow and underflow of the defined pixel range. Overflow causes very white pixels to appear in a generally black background. Underflow results in very dark pixels in a generally white background. Pixel values that result from underflow and overflow produce what is called "speckle" in a picture.

Typical MPEG standard video systems eliminate speckle using a saturation arithmetic operation, called a "saturation-add" instruction or operation, which adds an error value to a pixel value, detects overflow and underflow of summed pixel values, and sets the pixel values of overflowed and underflowed pixels to near the maximum and minimum possible pixel values, respectively. The saturation-add operation for 8-bit pixel values is described by pseudocode as follows:

$pixel_i + error_i = result_i$ if $(result_i < 0)$ $result_i = 0$;

if $(result_i > 255)$ $result_i = 255$;

where $pixel_i$ refers to a pixel value restored from motion compensation, $error_i$ refers to an inverse quantized and inverse discrete cosine transformed error term and $result_i$ refers to the sum of the pixel and error terms. In this example, $result_i$ is an eight-bit variable so that a valid range of pixel values is 0–255.

The saturation-add operation is typically performed by a hard-coded subroutine or using a lookup table. In either case, the saturation operation is costly in terms of computational burden and, therefore, speed of operation. What is needed is a saturation-add operation that greatly reduces computational burden but which substantially retains video quality.

SUMMARY OF THE INVENTION

In accordance with a first embodiment of the present invention, a method of executing a saturation-add operation includes the step of loading a plurality of pixel values into a respective plurality of segments of a first register. Each of the segments of the first register have a plurality of bits in a hierarchy of significance from a least significant bit to a most significant bit. The method also includes the steps of shifting bit values in the first register one bit to the right and masking the most significant bit in each of the segments of the first register. A plurality of pixel modification values corresponding to the plurality of pixel values are loaded into a respective plurality of segments of a second register. Each of the segments of the second register have a plurality of bits in a hierarchy of significance from a least significant bit to a most significant bit. The values in the first and second registers are added and the resulting sum is held in a sum register, which is shifted one bit to the left. Pixel values from a plurality of segments of the sum register are then utilized, with the plurality of sum register segments corresponding to the plurality of segments of the first register.

The video decoding apparatus taught herein is advantageous for greatly reducing the computational burden of video decoding by processing several pixels in parallel, thereby reducing the computational load by a factor approximating the number of pixels processed at one time.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
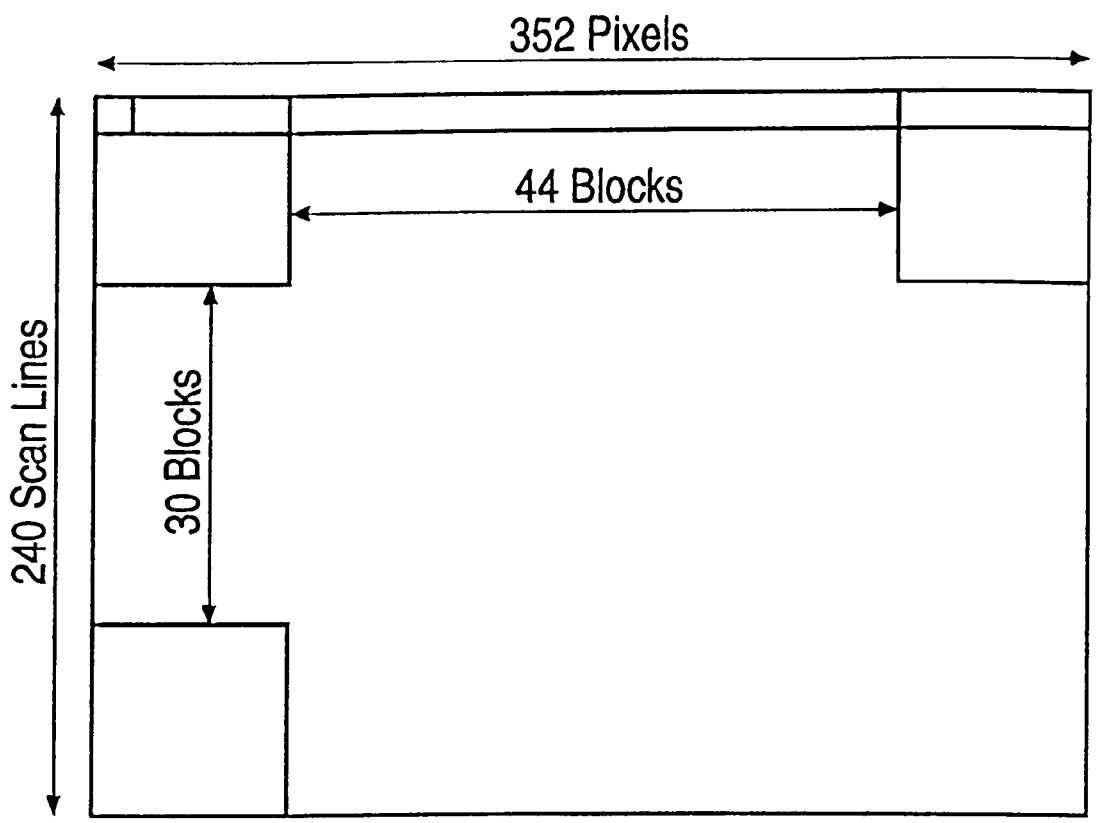
FIG. 1, labeled prior art, shows an arrangement of blocks of pixels on a display screen.
Figure 2:
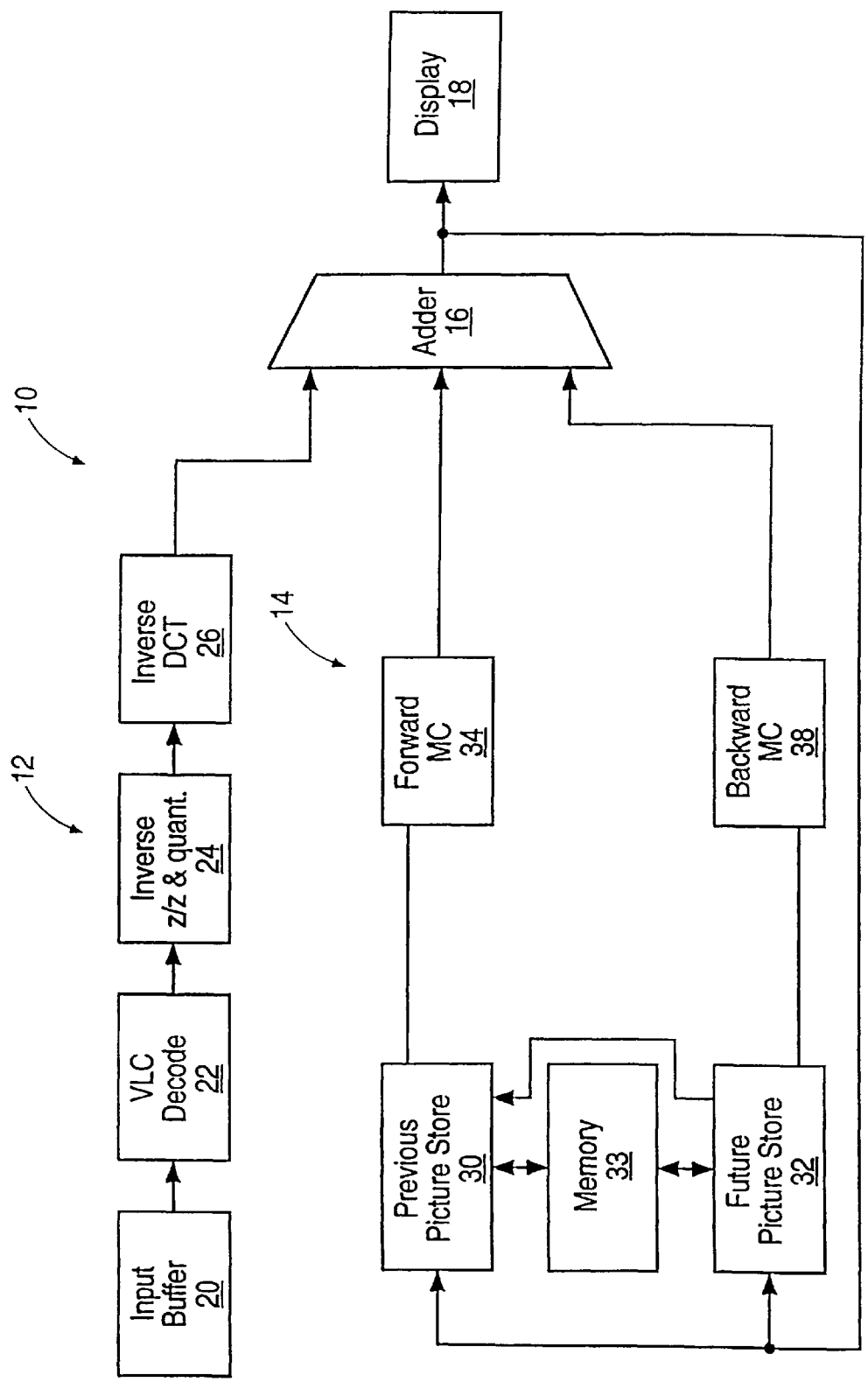
FIG. 2 shows a block diagram of a decoder video system in accordance with the present invention.

Referring to FIG. 2, a system for decompressing video information is shown. Video system 10 includes input stream decoding portion 12 incorporating an inverse discrete cosine transformation, motion decoding portion 14, adder 16 and display device 18. Input stream decoding portion 12 receives a stream of compressed video information and provides blocks of statically decompressed video information to adder 16. Motion decoding portion 14 receives motion information and provides motion compensation information to adder 16. Adder 16 receives the statically decompressed video information and the motion compensation information and provides decompressed video information to display 18.

Input stream decoding portion 12 includes input buffer 20, variable length coding (VLC) decoder 22, inverse zig-zag and quantizer circuit 24 and inverse digital cosine transform circuit 26. Motion decoding portion 14 includes previous picture store circuit 30, future picture store circuit 32, memory 33, forward motion compensation circuit 34 and backward motion compensation circuit 38. Display device 18 includes a picture buffer (not shown) which allows information provided by adder 16 to be rasterized prior to display by display device 18.

Input stream decoding portion 12 provides statically decompressed video signals to adder 16 on a block-by-block basis. Additionally, forward motion compensation circuit 34 and backward motion compensation circuit 38 of motion decoding portion 14 provide motion compensation signals to adder 16 on a macroblock by macroblock basis. Adder 16 provides a decompressed video signal to display 18 on a picture by picture basis. The decompressed video signal is also provided as a previous picture signal to previous picture store circuit 30 and future picture store circuit 32 (in the case of an I or P picture).

Figure 3:
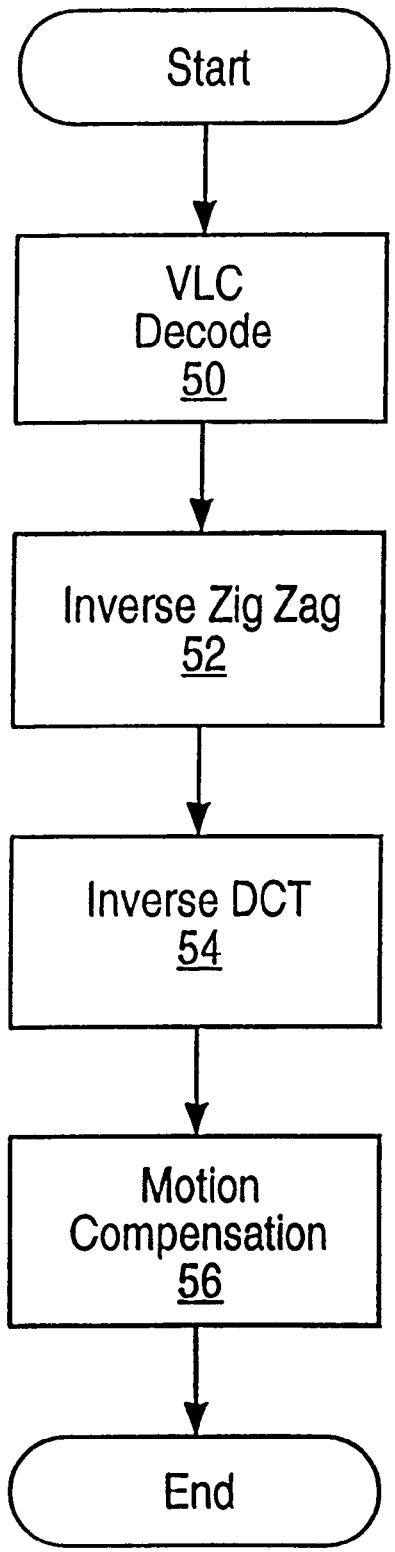
FIG. 3 shows a flow chart describing a process of decoding of video information which is encoded using the MPEG standard.

Referring to FIGS. 2 and 3, in operation, input buffer 20 receives a compressed video signal in the form of a bitstream from a video signal source such as a CD ROM (not shown); the compressed video signal is provided as a stream of compressed video information. Input buffer 20 buffers this compressed video signal to compensate for the speed which the signal is provided by the video source. The input bitstream is accumulated in the input buffer 20 until the bitstream data is to be utilized. This buffered compressed video signal is provided to VLC decoder 22 which decodes the variable length coded portion of the compressed signal at VLC decoding step 50 to provided a variable length decoded signal.

The variable length decoded signal is provided to inverse zig-zag and quantizer circuit 24 which, at inverse zig-zag and quantization step 52, decodes the variable length coded signal to provide a zig-zag decoded signal. Inverse zig-zag and quantizer circuit 24 produces actual DCT coefficients using a preset quantization step size. When a signal is encoded, data is run-length encoded in zig-zag ordering across an image so that compression is optimized. In general, most of the energy in an image is concentrated at the low frequency coefficients, which are conventionally written in the upper left corner of the transformed matrix, Therefore, image data which has been converted to a frequency representation typically has larger coefficients at lower spatial frequencies, clustered at the upper left corner of a frequency image block. Coefficients typically decrease along rays extending from the zero-frequency, or DC, term to higher spatial frequency terms. A block of data is compressed by discrete cosine transform (DCT) coefficient quantization. Discrete cosine transformation shifts the energy of the block to lower frequency coefficients. Quantization serves to remove small coefficients—coefficients that are smaller than a quantization step. Higher frequency coefficients have a larger quantization step. Zig-zag ordering is used to reorder the quantized discrete cosine transform (DCT) block of coefficients so that non-zero coefficients are transmitted first, thereby increasing transmission efficiency. The inverse zig-zag and quantization step 52 compensates for the fact that, while a compressed video signal is compressed in a zig-zag run length code (or decode) fashion, the zig-zag decoded signal is provided to inverse DCT circuit 26 as sequential blocks of video information. Accordingly, this zig-zag decoded signal provides blocks which are in a suitable order for raster scanning across display 18.

When a signal is encoded, an image block is first transformed from the spatial domain to the frequency domain using the Discrete Cosine Transform (DCT), which separates the signal into independent frequency bands. Most of the frequency information is in the upper left corner of the resulting block. The zig-zag decoded signal is applied to inverse DCT circuit 26 to convert the frequency domain image into the spatial domain. The inverse DCT circuit 26, at inverse DCT step 54, performs an inverse digital cosine transform on the zig-zag decoded video signal on a block-by-block basis to provide a statically decompressed video signal. This statically decompressed video signal corresponds to a single picture of video information. This single picture of video information may be used to present a static image on display 18 or may be used as a picture within a sequence of pictures for presentation of a motion image on display 18.

The statically decompressed signal is provided to adder 16 which, if the signal does not include any motion information (i.e., I pictures) provides this signal to display 18. However, for video signals which include motion information (i.e., B pictures and P pictures), adder 16 uses the forward motion compensation and backward motion compensation outputs from motion decode portion 19 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

VLC decoder 22 decodes a sequence of pictures in the following manner. VLC decoder 22 first decodes the header of a first picture, called picture 0, and determines that it is an I-picture. VLC decoder 22 produces quantized coefficients corresponding to the quantized DCT coefficients. These are assembled for each 8 by 8 block of pixels in the image by inverse zig-zag scanning. VLC decoder 22 decodes the header of the next picture, picture 3, and determines that it is a P-picture. For each inter-coded macroblock, the VLC decoder 22 decodes motion vectors giving the displacement from the stored previous picture, and quantized coefficients corresponding to the quantized DCT coefficients. The quantized DCT coefficients are error terms in the form of a difference block. For an inter-coded macroblock, all six blocks include IDCT values. For inter-coded or predicted macroblocks, not all six blocks include IDCT error terms. These quantized coefficients are inverse quantized to produce actual DCT coefficients. The coefficients are transformed into pixel difference values and added to the predicted block which are generated by applying the motion vectors to macroblocks in the stored previous picture. The resultant macroblock is displayed on display 18. This picture is not displayed until B-pictures 1 and 2 have been received, decoded, and displayed. VLC decoder 22 decodes the header of the next picture, picture 1, and determines that it is a B-picture. For each inter-coded macroblock, the VLC decoder decodes motion vectors giving the displacement from the stored previous or future pictures or both, and quantized coefficients corresponding to the quantized DCT coefficients of the difference block. These quantized coefficients are inverse quantized to produce actual DCT coefficients. The coefficients are inverse transformed into difference pixel values and added to a predicted macroblock produced by applying the motion vectors to the stored pictures. The resultant macroblock is stored in display 18. The macroblock is displayed at a suitable time.

Various embodiments of an apparatus and methodology for performing a saturation-add operation are described. All of the embodiments illustratively describe a saturation-add instruction with the characteristics that all pixel values are limited to the range of 0 to 255.

A suitably efficient saturation-add operation is a lookup table procedure which utilizes a clipping table clip[ ] with elements that are addressed using an input pixel value i. A typical range of the input pixel values i is from −384 to 640. The clipping table clip[ ] has a format as follows:

```
for(i=-384; i<640; i++) {
    if(i < 0) clip[i] = 0;
    else if(i > 255) clip[i] = 255;
    else clip[i] = i;
}
``` so that output values of clip[i] are zero for negative input pixel values i, output values of clip[i] are set to the maximum pixel value (e.g. 255) for input pixel values i which are greater than the maximum pixel value. Output values of clip[i] are set to the input pixel values i for input pixel values i which are in the range between zero and the maximum pixel value.

A suitably efficient lookup table procedure for performing a saturation-add operation which utilizes the clipping table clip[ ] is depicted in pseudocode as follows:

```
iblock=0;
for(iy=iycorner; iy<iycorner+8; iy++) {
    for (ix=ixcorner; ix<ixcorner+8; ix++) {
        pixel[ix][iy] = clip[pixel[ix][iy] +
error[iblock]];
        iblock++;
    }
}
``` where iblock addresses an element in array error[ ]—a 64-element DCT coefficient block, ix and iy designate x,y coordinates of an 8×8 block of pixels having an upper left corner at coordinates ixcorner, iycorner, and pixel[ ][ ] is an array of 8-bit pixels in a picture.

This suitably efficient saturation-add operation performs a table lookup function on essentially every pixel in a video picture. In a SIF video, for example, 352×240 pixels/frame or 330 macroblocks/frame are processed. In a typical video picture, only 5% to 7% of macroblocks are skipped so that approximately 310×6×8×8 (19,040) pixels/frame are processed by the saturation-add operation.

The computational burden of the suitably efficient saturation-add operation is sufficiently large that alternative, less burdensome techniques are desired.

Figure 4A:
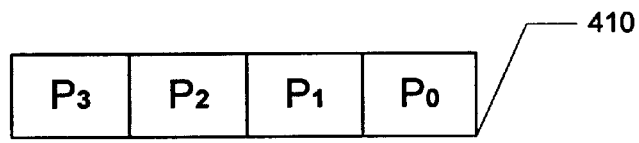
FIGS. 4(a) through 4(g) are a set of schematic diagrams which illustrate a sequence of register manipulations which are performed in one embodiment of a saturation-adder operation.

Referring to FIGS. 4(a) through 4(g), there is shown an alternative embodiment of a saturation-add operation. FIG. 4(a) illustrates a 32-bit register which results from a first step of the alternative saturation-add operation. In this step four pixels of data $P_0$, $P_1$, $P_2$ and $P_3$ are read into a first register 410. These four pixels of data correspond to data to be written to four elements of the pixel[ ][ ] array.

Figure 4B:
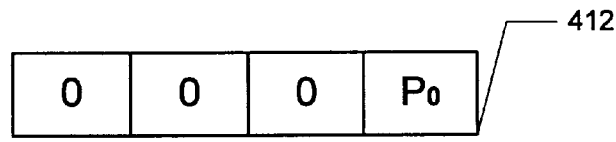
Figure 4C:
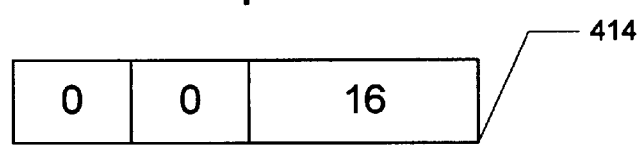
Figure 4D:
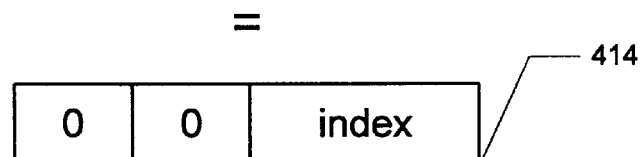
Figure 4E:
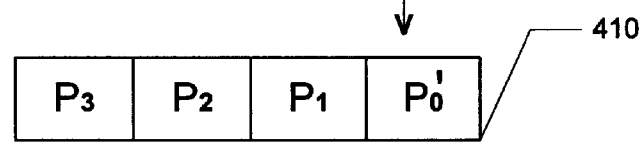

In a second step of the alternative saturation-add instruction, the first pixel of data $P_0$ is loaded into the least significant byte (LSB) of a second 32-bit register 412 while other bytes are loaded with a zero value, shown in FIG. 4(b). In a third step, a 16-bit error term $E_0$ is loaded into the two least significant bytes of a third register 414, shown in FIG. 4(c). The 16-bit error term $E_0$ corresponds to an element in array error[ ], a 64-element DCT coefficient block. The error terms result from differences between pixel values computed in the motion compensation operation and actual pixel values. In a fourth step, register 412 and register 414 are added so that the 8-bit first pixel of data $P_0$ is added to the 16-bit error term $E_0$ and the sum, a 16-bit index index into the clipping table clip[ ], is stored in register 414, shown in FIG. 4(d). In a fifth step, the 16-bit index index is used to address an element of the clipping table clip[index]. Data $P_0'$ resulting from the saturation-add operation, which is obtained from the clipping table clip[index], is loaded back to the LSB of the first 32-bit register 410 so that the first register 410 holds four pixels of data $P_0'$, $P_1$, $P_2$ and $P_3$, shown in FIG. 4(e).

Figure 4F:
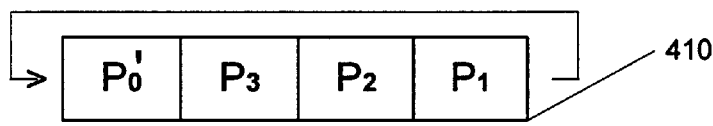

In a sixth step, the four pixels of data $P_0'$, $P_1$, $P_2$ and $P_3$ are rotated right by eight bits so that pixel data $P_0'$ moves to the most significant byte (MSB) of register 410 and other bytes are shifted lower one significant byte, shown in FIG. 4(f). Register 410 is then written back to frame memory to store the processed data.

Figure 4G:
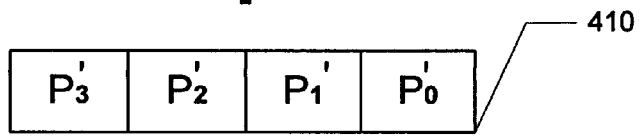

The steps performed in FIGS. 4(a), 4(b), 4(c), 4(d), 4(e) and 4(f) are repeated three additional times so that all four pixels of data $P_0$, $P_1$, $P_2$ and $P_3$ are processed using the saturation-add operation and the register 410 resulting from the four loops of the saturation-add operation holds four processed pixels of data $P_0'$, $P_1'$, $P_2'$ and $P_3'$, shown in FIG. 4(g). The computational burden for processing one pixel using this alternative saturation-add operation is approximated by the number of instructions performed in the six steps illustrated in FIGS. 4(a), 4(b), 4(c), 4(d), 4(e) and 4(f).

Figure 5A:
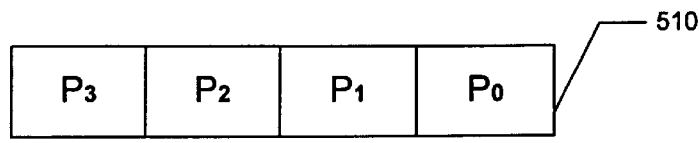
FIGS. 5(a) through 5(f) are a set of schematic diagrams which illustrate a sequence of register manipulations which are performed in an improved-efficiency embodiment of a saturation-adder operation.

Referring to FIGS. 5(a) through 5(f), there is shown an alternative embodiment of a saturation-add operation having an improved efficiency by virtue of parallel processing of various operations on multiple pixels. Much processing time and computational burden are saved using parallel processing of four pixels at one time. FIG. 5(a) illustrates a 32-bit register 510 which results from a first step of the improved-efficiency saturation-add operation. In this step, four pixels of data $P_0$, $P_1$, $P_2$ and $P_3$ are read into a pixel register 510. These four pixels of data correspond to data to be written to four elements of the pixel[ ][ ] array.

Figure 5B:
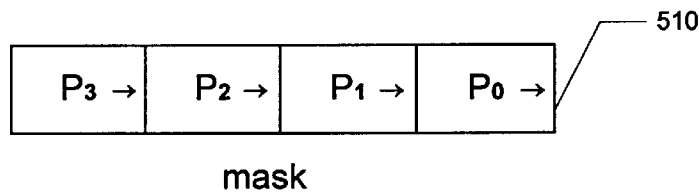
Figure 5C:
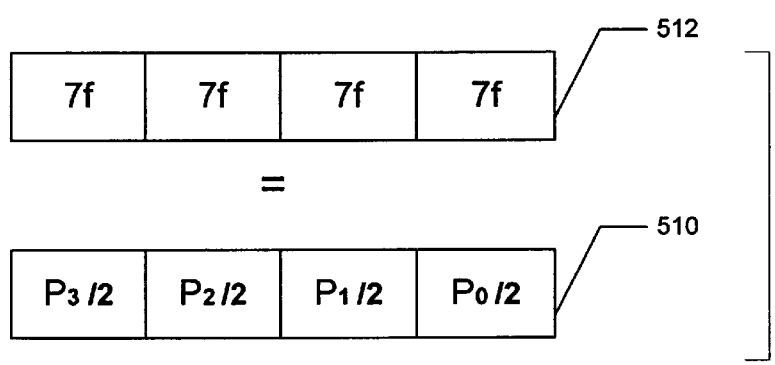

Referring to FIG. 5(b), in a second step of the improved-efficiency saturation-add instruction, pixel register 510 is shifted right one-bit so that the four pixels of data $P_0$, $P_1$, $P_2$ and $P_3$ are shifted right by one bit, thereby dividing the value in each pixel by two. In a third step, a mask register 512 holding the hexadecimal value "7F 7F 7F 7F" is ANDed with the pixel register 510 and saved in the pixel register 510 so that the pixel register 510 holds four pixels $P_0/2$, $P_1/2$, $P_2/2$ and $P_3/2$ shown in FIG. 5(c), each pixel having a value of one-half the respective corresponding original pixel value $P_0$, $P_1$, $P_2$ and $P_3$.

Figure 5D:
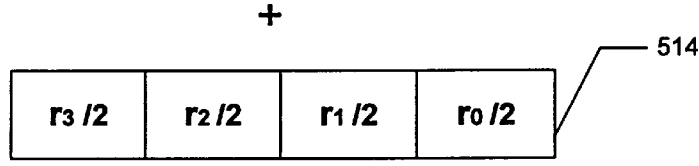

In a fourth step, four 7-bit error terms $E_0/2$, $E_1/2$, $E_2/2$ and $E_3/2$ are loaded into an error register 514, shown in FIG. 5(d). The four 7-bit error terms $E_0f/2$, $E_1/2$, $E_2/2$ and $E_3/2$ correspond to four elements in array error[ ], a 64-element DCT coefficient block. Each element $E_0/2$, $E_1/2$, $E_2/2$ and $E_3/2$ corresponds to an error term of array error[ ] which is divided by two. Little accuracy is lost because nearly all error terms fall into the range of values from −128 to +127, the seven-bit range. The error terms, including error terms $E_0/2$, $E_1/2$, $E_2/2$ and $E_3/2$, are generated following a motion compensation operation by determining the difference between pixels computed in motion compensation and actual pixel values.

Thus, the improved-efficiency saturation-add operation reduces the resolution of the pixel[ ][ ] and error[ ] array elements to seven bits, causing two types of reduction of video quality. A first type of quality reduction is a degradation caused by a loss of resolution in pixel bit depth. A second type of quality reduction is a degradation that results from the very infrequently-occurring DCT elements in the error[ ] array that have an amplitude which is too large for the element to be represented by an 8-bit quantity.

Figure 5E:
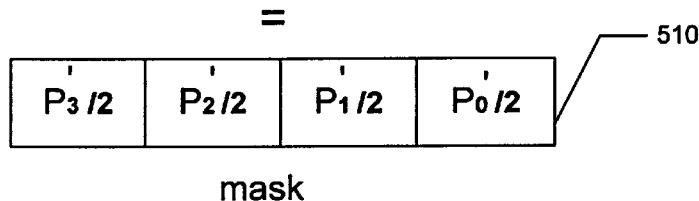
Figure 5F:
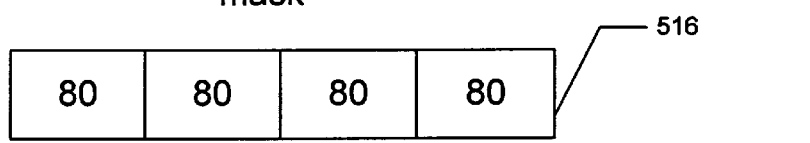
Figure 5F:
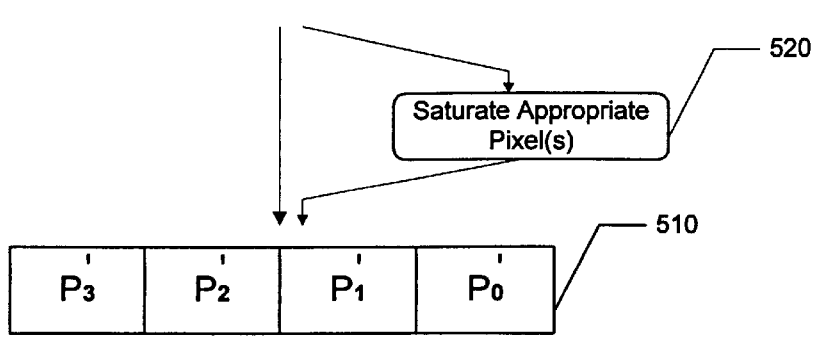

In a fifth step, pixel register 510 and error register 514 are added so that the four 7-bit pixels of data $P_0/2$, $P_1/2$, $P_2/2$ and $P_3/2$ are added to the four 7-bit error terms $E_0/2$, $E_1/2$, $E_2/2$ and $E_3/2$ and the sums, processed pixels $P_0'/2$, $P_1'/2$, $P_2'/2$ and $P_3'/2$ are held in pixel register 510, shown in FIG. 5(e). If the sum of any pixel value is greater than +127, an overflow condition has occurred. This overflow condition is tested in a sixth step in which a mask register 516 holding the hexadecimal value "80 80 80 80" is ANDed with the pixel register 510 to detect saturation of any of the four pixels. The result of the AND operation is not saved in the pixel register 510. If the most significant bit of any 8-bit pixel in pixel register 510 is set, a routine 520 is performed which saturates any pixel having the most significant bit set. Typically, the saturation routine 520 sets a byte value in pixel register 510 to a hexadecimal "7F" if the most significant bit of that byte is set. Saturation is estimated to occur less than 1% of the time so that the saturation routine 520 is rarely accessed and does not significantly increase the computational burden of the saturation-add operation.

In a sixth step, the pixel register 510 is shifted left one bit so that the four processed pixels of data $P_0'/2$, $P_1'/2$, $P_2'/2$ and $P_3'/2$ are each shifted left, which is equivalent to multiplying each pixel value by two. Following the left shift operation, pixel register 510 holds four processed pixels of data $P_0'$, $P_1'$, $P_2'$ and $P_3'$, shown in FIG. 5(f). Pixel register 510 is then written back to frame memory to store the processed data. The computational burden for processing four pixels using this improved-efficiency saturation-add operation is approximated by the number of instructions performed in the six steps illustrated in FIGS. 5(a), 5(b), 5(c), 5(d), 5(e) and 5(f). Thus, the computational burden is reduced by approximately three-quarters using the improved-efficiency saturation-add operation.

The description of certain embodiments of this invention is intended to be illustrative and not limiting. Numerous other embodiments will be apparent to those skilled in the art, all of which are included within the broad scope of this invention. For example, the embodiments described herein are computer-based implementations. Electronic circuit based embodiments which perform the same function are expressly included within the scope of the claims. The saturation operation is described herein using 8-bit pixels but the scope of the invention also applies to other bit-sizes, both larger and smaller. The saturation operation is described herein utilizing an MPEG decompression standard, but is easily altered to conform to other data decompression techniques.

What is claimed is:

1. A method of executing a saturation-add operation comprising:

loading a plurality of multiple-bit pixel values corresponding to a plurality of pixel storage locations of an image memory into a respective plurality of segments of a first register, each of the segments of the first register having a plurality of bits in a hierarchy of significance from at least significant bit to a most significant bit;

shifting the plurality of pixel values in the first register one bit to the right in a single, multiple-bit shift operation;

masking the most significant bit of the shifted plurality of pixel values in each of the segments of the first register in a single, multiple-bit mask operation;

loading a plurality of pixel modification values corresponding to the plurality of pixel values into a respective plurality of segments of a second register, each of the segments of the second register having a plurality of bits in a hierarchy of significance from a least significant bit to a most significant bit;

adding the pixel values and the pixel modification values in the first and second registers respectively and holding a resulting sum in a sum register having a plurality of segments;

shifting the resulting sum values in the sum register one bit to the left; and displaying a plurality of pixel values to a plurality of pixel locations on a display, the plurality of pixel values being retrieved from the plurality of segments of the sum register, the plurality of segments of the sum register corresponding to the plurality of segments of the first register.

2. A method according to claim 1 further comprising:

subsequent to the adding operation and prior to the left shifting operation, testing the most significant bit in each of the segments of the sum register; and for a segment of the sum register having the most significant bit in a set condition, setting the segment value to a preselected saturated value.

3. A method according to claim 1 wherein the displaying operation includes writing the plurality of pixel values to a picture memory.

4. A method according to claim 1 wherein the pixel values are restored from coded data which are encoded using a motion compensation operation.

5. A method according to claim 4 wherein the pixel modification values are restored from coded data which are encoded from difference values specifying the difference between a motion-predicted picture and an actual picture.

6. A method according to claim 5 wherein the pixel modification values are inverse quantized and inverse discrete cosine transformed values.

7. A method according to claim 1 wherein:

the first register, second register and sum register are 32-bit registers.

8. A method according to claim 7 wherein:

the segments of the plurality of segments in the first register, the second register and the sum register are 8-bit registers.

9. A method according to claim 1 wherein the pixel modification values are 7-bit two's complement values having a range of −128 to +127.

10. A method according to claim 9 wherein the pixel modification values are compressed from 16-bit two's complement values having a range of −128 to +127.

11. A system for decompressing video information comprising:

an input stream decoding portion implemented in a processor and including an inverse discrete cosine transformation;

an adder implemented in the processor and coupled to the input stream decoding portion; and an executable program code implementing the method of claim 1.

12. An article of manufacture encoding an executable program code executing on the processor and implementing the method of claim 11.

13. A method of executing a saturation-add operation comprising:

loading a plurality of multiple-bit pixel values corresponding to a plurality of pixel storage locations of an image memory into a respective plurality of segments of a first register, each of the segments of the first register having a plurality of bits in a hierarchy of significance from a least significant bit to a most significant bit;

shifting the plurality of bits in the first register one bit in a first direction in a single, multiple-bit shift operation;

masking one bit of the plurality of shifted bits in each of the segments of the first register in a single multiple-bit mask operation;

loading a plurality of pixel modification values having a one-to-one correspondence to the plurality of pixel values into a corresponding plurality of segments of a second register, each of the segments of the second register having a plurality of bits in a hierarchy of significance from a least significant bit to a most significant bit;

adding the values in the first and second registers and holding a resulting sum in a sum register; and shifting resulting sum values in the sum register one bit in a second direction opposite to the first direction.

14. A method according to claim 13 wherein:

the first direction of shifting is a right shift operation; and the bit masked in each segment of the first register is a most significant bit.

15. A method according to claim 13 further comprising:

subsequent to the adding operation and prior to the resulting sum value shifting operation, testing a bit in each of the segments of the sum register; and for a segment of the sum register having the bit set, setting the segment value to a preselected saturated value.

16. A method according to claim 13 further comprising:

writing the plurality of pixel values to a picture memory.

17. A system for decompressing video information comprising:

an input stream decoding portion implemented in a processor and including an inverse discrete cosine transformation;

an adder implemented in the processor and coupled to the input stream decoding portion; and an executable program code implementing the method of claim 13.

18. An article of manufacture encoding an executable program code executable on the processor and implementing the method of claim 17.

* * * * *